March 3, 1970 BACKMAN WONG 3,498,537
FAIL-SAFE THERMOSTATIC FLUID VALVE STRUCTURE
Filed Aug. 26, 1968
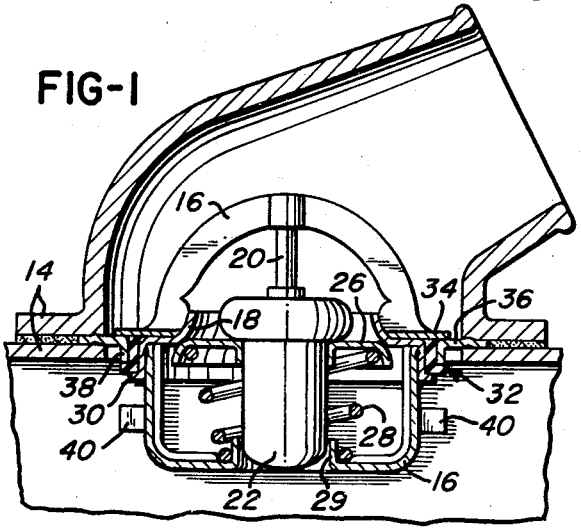
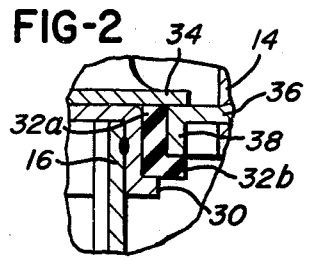
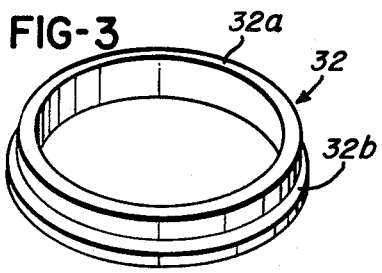
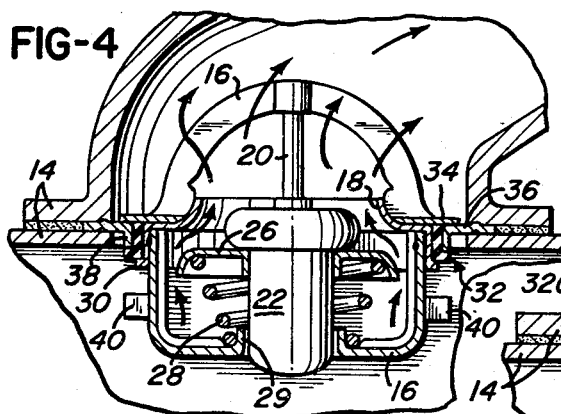
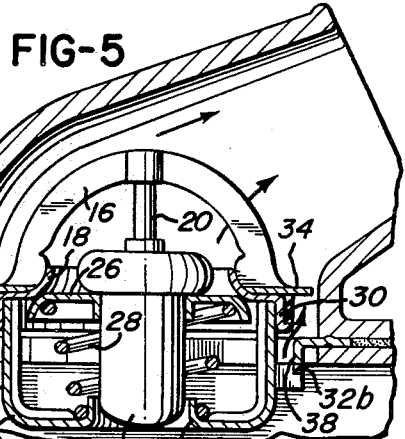
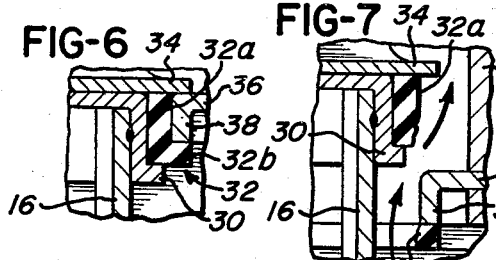
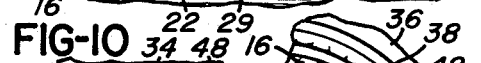
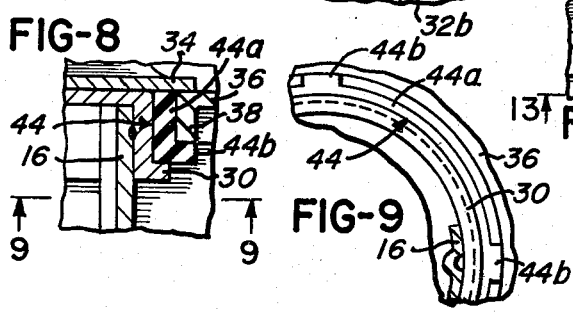
INVENTOR
BACKMAN WONG
BY William R Jacox
ATTORNEY United States Patent Office 3,498,537
Patented Mar. 3, 1970

3,498,537
FAIL-SAFE THERMOSTATIC FLUID VALVE
STRUCTURE
Backman Wong, Wayland, Mass., assignor to Standard-Thomson Corporation, Waltham, Mass., a corporation of Delaware
Filed Aug. 26, 1968, Ser. No. 755,258
Int. Cl. F01p 7/02; G05d 23/00
U.S. Cl. 236—34                              16 Claims

ABSTRACT OF THE DISCLOSURE

Fail-safe thermostatic fluid valve structure which is particularly adapted for use in the cooling system of an internal combustion engine but which may be used with other systems, machines, or apparatus. The fail-safe thermostatic fluid valve structure includes a thermally responsive operator member which is joined to a movable closure member for control of fluid flow during normal operating conditions. The structure also includes special connection means which attach together elements of the structure. The special connection means permits separation of the elements if the thermostatic valve structure should be subjected to abnormal fluid temperature and/or fluid pressure conditions. Such separation of the elements permits fluid flow.

BACKGROUND OF THE INVENTION

Numerous types and kinds of thermostatic valve devices have been created for use in the cooling system of an internal combustion engine. These thermostatic valve devices are generally capable of controlling flow of fluid within the cooling system in accordance with the temperature of the fluid within the system. On occasion, an element of a thermostatic valve may fail. In such event, the valve may not operate to control fluid flow, and the temperature of the fluid may become excessively high. Of course, under such conditions, the machine or apparatus normally cooled by the fluid may be damaged.

It is an object of this invention to provide thermostatic valve structure which normally controls fluid flow in accordance with the temperature of the fluid and which fails safe if failure of an element of the structure occurs.

It is another object of this invention to provide such fail safe thermostatic valve structure which can be constructed at relatively low costs.

Other objects and advantages reside in the construction of parts, the combination thereof, the method of manufacture, and the mode of operation as will become more apparent from the description of the illustrative embodiments.

BRIEF DESCRIPTION OF THE DRAWING

FIGURE 1 is a sectional view of thermostatic valve structure of this invention mounted within conduit structure of a cooling system of an internal combustion engine.

FIGURE 2 is an enlarged fragmentary sectional view of a portion of the thermostatic valve structure shown in FIGURE 1.

FIGURE 3 is a perspective view, drawn on a slightly smaller scale than FIGURE 2, of the connection member of the thermostatic valve structure of FIGURE 2.

FIGURE 4 is a sectional view, similar to FIGURE 1, showing the thermostatic valve structure of this invention in an open operating condition.

FIGURE 5 is a sectional view, similar to FIGURES 1 and 4, showing the thermostatic valve structure in a condition following failure of an element thereof.

FIGURE 6 is an enlarged fragmentary sectional view similar to FIGURE 2, showing a portion of the connector means which provides fail-safe operation of the structure.

FIGURE 7 is an enlarged fragmentary sectional view, similar to FIGURES 2 and 6, illustrating fail-safe operation of the connector means.

FIGURE 8 is a fragmentary sectional view similar to FIGURES 2 and 6, showing a modification in the connector means of the structure of this invention.

FIGURE 9 is a sectional view, taken substantially on line 9—9 of FIGURE 8.

FIGURE 10 is a fragmentary sectional view, similar to FIGURES 2, 6, and 8, showing another modification in the connector means of the structure of this invention.

FIGURE 11 is a sectional view, drawn on a slightly smaller scale than FIGURE 10, taken substantially on line 11—11 of FIGURE 10.

FIGURE 12 is a sectional view, similar to FIGURES 2, 6, 8, and 10, showing another modification in the connector means of the structure of this invention.

FIGURE 13 is a sectional view, drawn on a slightly smaller scale than FIGURE 12, taken substantially on line 13—13 of FIGURE 12.

DESCRIPTION OF THE PREFERRED EMBODIMENTS

FIGURE 1 shows thermostatic valve structure of this invention disposed within conduit structure 14. The thermostatic valve structure comprises a frame 16 which has an annular valve seat 18 forming a fluid port therethrough. Attached to the frame 16 is a stem 20 which extends through the fluid port which is formed by the valve seat 18.

The stem 20 has a portion thereof disposed within a container 22 which contains thermally responsive expansible-contractible material, not shown. The stem 20 and the container 22 with the thermally responsive expansible-contractible material therewithin thus serves as an actuator, and may be of the type disclosed in Patents No. 2,806,375 and No. 2,806,376 or may be of any other suitable type. During expansion of the thermally responsive material within the container 22 there is relative movement between the stem 20 and the container 22, in a direction one away from the other.

A closure member 26 is attached to the container 22 for movement therewith. A helical spring 28 encompasses the container 22 and has one end portion thereof in engagement with the closure member 26. The other end portion of the helical spring 28 is in engagement with the frame 16. Thus, the spring 28 urges the closure member 26 toward the valve seat 18 for normal engagement therewith, as shown in FIGURE 1.

The portion of the spring 28 which engages the frame 16 encompasses an annular guide portion 29 of the frame 16 through which the container 22 is axially movable.

The frame 16 is provided with an annular projection 30. An annular connector member 32 engages the annular projection 30 and the frame 16 adjacent thereto. The connector member 32 comprises a cylindrical portion 32a and a lateral portion 32b, as best shown in FIGURES 2 and 6. The connector member 32 consists of any suitable fusible material which is normally rigid. The connector member 32 may consist of solder, or plastics material, or the like, which fuses or melts or at least becomes soft at a temperature slightly above the normal operating temperature of the thermostatic valve structure. The connector member 32 may also have a frangible characteristic or may have a portion thereof which is readily frangible.

An annular extension disc 34 is attached to the frame 16 and extends therefrom and engages an annular flange 36, as shown in FIGURES 1, 2, 4, and 6. The annular flange 36 has a collar 38 which is normal thereto and which is in engagement with the portions 32a and 32b of the connector member 32. The connector member 32 joins the frame 16 to the flange 36.

The annular flange 36 extends outwardly from the frame 16 and is shown clamped between two portions of the conduit structure 14. Thus, the thermostatic valve structure of this invention is adapted to be retained within a fluid conduit, such as the conduit 14, to control flow of fluid therethrough.

OPERATION

As shown in FIGURE 1, the thermostatic valve structure of this invention, disposed within the fluid conduit structure 14, controls flow of fluid from the lower portion of the conduit structure 14 to the upper portion thereof.

Fluid at the lower portion of the conduit structure 14 engages the container 22. When the temperature of the fluid which engages the container 22 is below a given value, the container 22 is positioned as shown in FIGURE 1. This is due to the fact that the thermally responsive material within the container 22 at a temperature below the given value does not exert a force upon the stem 20 within the container 22 for urging relative movement between the stem 20 and the container 22. Therefore, the spring 28 maintains the closure member 26 in engagement with the valve seat 18. Thus, as shown in FIGURE 1, the thermostatic valve structure is closed and fluid cannot flow through the fluid port formed by the annular valve seat 18.

If the temperature of the fluid which is in engagement with the container 22 increases above the given value, the thermally responsive material within the container 22 expands to such an extent that the thermally responsive material therewithin causes relative movement between the stem 20 and the container 22. Due to the fact that the stem 20 is attached to the frame 16, the container 22 moves in a downward direction away from the stem 20, as the stem 20 remains within the container 22. Thus, the container 22 moves the closure member 26 downwardly and away from the valve seat 18, as illustrated in FIGURE 4. Downward movement of the container 22 is guided by the guide portion 29 of the frame 16 through which the container 22 extends. Thus, fluid flows through the fluid port formed by the annular valve seat 18, as illustrated in FIGURE 4. Such downward movement of the closure member 26 is against the forces of the spring 28.

When the temperature of the fluid engaging the container 22 decreases below the predetermined given value, the thermally responsive material therewithin decreases in volume. Therefore, the spring 28 forces the closure member 26 toward the valve seat 18. If the temperature of the fluid engaging the container 22 decreases sufficiently, the spring 28 is permitted to force the closure member 26 into engagement with the valve seat 18 to again close the fluid port formed thereby, in the manner illustrated in FIGURE 1.

Thus, during normal operation, the closure member 26 moves toward and away from the valve seat 18 and controls flow of fluid through the fluid port formed by the valve seat 18. Such movement is in response to the changes in temperature of the fluid which engages the container 22.

Means are provided for protection of the apparatus with which the fluid conduit 14 is associated, in the event that a defect should occur in the thermostatic valve structure of this invention which affects the normal operation thereof. If a defect should occur in the actuator means or in any other element of the thermostatic valve structure, the closure member 26 may not be moved in a direction from the valve seat 18 when the fluid which engages the container 22 is of a value higher than the given value at which such movement should occur. Therefore, the fluid port formed by the valve seat 18 is not opened. Thus, the temperature of the fluid in engagement with the container 22 may become excessively high without flow or circulation of the fluid within the conduit structure 14.

The fluid which engages the container 22 also engages the connector member 32. Thus, the connector member 32 is heated. If the connector member 32 is heated to a predetermined temperature, which is in excess of the normal operating temperature of the container 22, the heat applied to the connector member 32 causes the connector member 32 to fuse or melt or to break or at least to soften from its normal rigid condition. Thus, pressure of the fluid upon the lower surface of the closure member 26 forces a major portion of the thermostatic valve structure upwardly, as shown in FIGURE 5, as portions of the connector member 32 are severed one from the other, as illustrated in FIGURES 5 and 7. All elements of the thermostatic valve structure move upwardly, except the flange 36 and perhaps, a portion of the connector member 32, as shown in FIGURE 5. Thus, fluid is permitted to flow from the lower portion of the conduit structure 14 to the upper portion thereof, as shown in FIGURES 5 and 7.

The connector member 32 is of such physical dimensions and characteristics that a predetermined quantity of heat therein and/or a predetermined total pressure applied thereto causes separation of portions of the connector member 32 in the manner best illustrated in FIGURE 7.

As the frame 16 moves upwardly following breaking of the connector member 32, one or more lugs 40 which are attached to the frame 16 engage the collar 38 of the flange 36, as shown in FIGURE 5. Thus, the frame 16 is limited in its movement with respect to the fluid conduit structure 14.

Thus, the thermostatic valve structure of this invention fails safe and permits flow of fluid if, for some reason, normal fluid flow control operation fails to occur.

FIGURES 8 AND 9

FIGURES 8 and 9 show a modification in the connector means of this invention. A connector member 44 has a cylindrical portion 44a which is disposed between the frame 16 and the collar 38 of the flange 36. The connector member 44 has a plurality of tabs 44b which extend laterally from the cylindrical portion 44a and which engage the lower surface of the collar 38.

The tabs 44b may consist of the same material or a different material from the material of the cylindrical portion 44a. The tabs 44b may sever rather easily under the influence of fluid pressure upon the closure member 26, with no melting of the connector member 44 or, perhaps, with only a slight amount of melting of the connector member 44. Such a connector member 44 is desirable in some conditions of use of a thermostatic valve structure of this invention.

FIGURES 10 AND 11

FIGURES 10 and 11 show a connector member 48 which comprises a ring of fusible and/or frangible material which attaches the extension disc 34 to the flange 36. A relatively small amount of heat and/or fluid pressure is capable of causing breaking apart of portions of the connector member 48 or in causing severance of the connector member 48 from the extension disc 34 and/or from the flange 36.

FIGURES 12 AND 13

FIGURES 12 and 13 show a plurality of spaced-apart fusible and/or frangible connector members or bodies 50 which attach the extension disc 34 to the flange 36. A relatively small amount of heat and/or fluid pressure can cause severance of the extension member 34 from engagement with the flange 36.

SUMMARY

A connector member or connector means of this invention connects together portions of the thermostatic valve structure so that under the influence of heat and/or pressure in excess of predetermined values thereof, release action occurs. Thus, parts of the thermostatic valve which are normally connected together are permitted to separate so that fluid flow can occur. The connection means is such that either heat or pressure or a combination thereof acting upon the connector means permits the release action to occur.

The invention having thus been described, the following is claimed:

1. Fail-safe thermostatic valve structure comprising:
    support structure having an annular valve seat forming a fluid port therethrough,
    thermally resonsive actuator means connected to the support structure,
    closure means operatively connected to the actuator means, the closure means being normally in engagement with the valve seat to close the fluid port therethrough, the closure mean being movable away from the valve seat by the actuator means at a given operating temperature thereof,
    attachment means for attachment to fluid conduit means,
    connector means connecting the support structure to the attachment means, the connector means having at least a portion thereof fusible at a release temperature above said given operating temperature to sever the connection between the attachment means and the support structure.

2. The fail-safe thermostatic valve structure of claim 1 in which the attachment means comprises a flange.

3. The fail-safe thermostatic valve structure of claim 1 in which the connector means is annular.

4. The fail-safe thermostatic valve structure of claim 1 in which the connector means is annular and has a cylindrical portion and a portion which extends laterally from the clindrical portion.

5. The fail-safe thermostatic valve structure of claim 1 in which the connector means is a cylindrical member having a plurality of tabs extending laterally therefrom.

6. The fail-safe thermostatic valve structure of claim 1 in which the connector means comprises a plurality of small bodies.

7. The fail-safe thermostatic valve structure of claim 1 in which the connector means has at least a portion thereof frangible at a tempearture below said release temperature so that total fluid pressure above a given value acting upon the closure means may cause breaking of the connector means.

8. The fail-safe thermostatic valve structure of claim 1 in which the connector means has at least a portion thereof frangible at a temperature substantially equal to said release temperature.

9. The fail-safe thermostatic valve structure of claim 1 in which abutment means are attached to the support structure and engageable with the attachment means to limit the movement of the support structure with respect to the attachment means following severance of the connection between the attachment means and the support structure.

10. Fail-safe thermally responsive fluid valve structure comprising:
    attachment means for attachment to conduit structure,
    thermally responsive valve means operable at a given operating temperature,
    connector means connecting the thermally responsive valve means to the attachment means, the connector means being normally rigid, the connector means being fusible at a tempearture in excess of said given operating temperature.

11. The fail-safe thermally responsive fluid valve structure of claim 10 in which the thermally responsive valve means includes a closure member and in which the connector means has at least a portion thereof which is frangible when total fluid pressure upon the closure member is of a given value.

12. The fail-safe thermally responsive fluid valve structure of claim 10 in which the connector means comprises a plurality of spaced-apart bodies.

13. The fail-safe thermally responsive fluid valve structure of claim 10 in which the connector means comprises a strip.

14. The fail-safe thermally responsive fluid valve structure of claim 10 in which the connector means comprises an annular member having a cylindrical portion and a plurality of portions which extend laterally from the cylindrical portion.

15. The fail-safe thermally responsive fluid valve structure of claim 14 in which each of the portions which extend laterally are readily severable from the cylindrical portion.

16. Fail-safe thermostatic valve structure comprising:
    thermally responsive valve means, including a frame having a valve seat forming a flow passage, a closure member movable into and out of engagement with the valve seat for closing and opening the flow passage at normal operating temperatures,
    a flange for attachment to fluid conduit structure,
    connector means joining the frame to the flange, the connector means comprising a material which fuses at a temperature in excess of said normal operating temperatures, fusing of the connection means thus causing separation of the frame from the flange.

References Cited

UNITED STATES PATENTS 2,740,586   4/1956   Chaniot.
3,045,918   7/1962   Woods _____ 236—34

EDWARD J. MICHAEL, Primary Examiner

U.S. Cl. X.R.

137—73; 236—93